United States Patent
Nadkarni et al.

(10) Patent No.: US 11,929,904 B2
(45) Date of Patent: *Mar. 12, 2024

(54) SYSTEM AND METHOD FOR MONITORING NETWORK PERFORMANCE

(71) Applicant: Netscout Systems, Inc., Westford, MA (US)

(72) Inventors: Rajeev Nadkarni, Westford, MA (US); Abhishek Saraswati, Westford, MA (US); Anil K. Singhal, Westford, MA (US); Bruce A. Kelley, Jr., Westford, MA (US); Narendra Byrapuram, Westford, MA (US); John Peter Curtin, Westford, MA (US); Tauras Liubinskas, Westford, MA (US)

(73) Assignee: Netscout Systems, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,671

(22) Filed: Jan. 18, 2023

(65) Prior Publication Data

US 2023/0155913 A1     May 18, 2023

Related U.S. Application Data

(63) Continuation of application No. 17/837,730, filed on Jun. 10, 2022, now Pat. No. 11,588,718, which is a
(Continued)

(51) Int. Cl.
*H04L 43/12* (2022.01)
*H04L 12/26* (2006.01)
(Continued)

(52) U.S. Cl.
CPC ............ *H04L 43/12* (2013.01); *H04L 43/028* (2013.01); *H04L 43/062* (2013.01)

(58) Field of Classification Search
CPC ..... H04L 43/12; H04L 43/028; H04L 43/062; H04L 41/40; H04L 43/08; H04L 43/20; H04L 41/0896
See application file for complete search history.

(56) References Cited

U.S. PATENT DOCUMENTS 9,251,535 B1      2/2016   Krishna et al.
10,135,698 B2   11/2018   Groenendijk et al.
(Continued)

FOREIGN PATENT DOCUMENTS

WO    WO-2015028048 A1 *  3/2015  ......... H04L 12/4633

OTHER PUBLICATIONS

Eileen Singh, NETSCOUT: Manage Unified Communications Efficiently, Nov. 24, 2017, URL retrieved via: https://unified-communications.cioapplications.com/vendor/netscout-nasdaq-ntct-manage-unified-communications-efficiently-cid-1116-mid-60.html (Year: 2017).*

(Continued)

*Primary Examiner* — Schquita D Goodwin
(74) *Attorney, Agent, or Firm* — Foley & Lardner LLP

(57) ABSTRACT

Method for monitoring network performance in a telecommunication network coupled with a plurality of Virtual Machines (VM) arranged in a cluster format is disclosed. A packet is received at a VM smart cluster device. Metadata is extracted from the packet. The packet can be distributed to one of the plurality of VMs. Key performance indicator (KPI) session related data associated with a subscriber in one of the plurality of VMs that receives the distributed packet can be generated.

18 Claims, 3 Drawing Sheets

Related U.S. Application Data continuation of application No. 16/849,463, filed on Apr. 15, 2020, now Pat. No. 11,381,491.

(60) Provisional application No. 62/833,942, filed on Apr. 15, 2019.

(51) Int. Cl.
  *H04L 43/028* (2022.01)
  *H04L 43/062* (2022.01)

(56) References Cited

U.S. PATENT DOCUMENTS

| | | | |
|---|---|---|---|
| 10,277,736 B2 | 4/2019 | Yasrebi et al. | |
| 10,320,621 B1* | 6/2019 | Neisinger | H04L 41/147 |
| 10,505,825 B1 | 12/2019 | Bettaiah et al. | |
| 10,671,628 B2 | 6/2020 | Sullivan et al. | |
| 10,880,191 B1* | 12/2020 | Kant | H04L 43/022 |
| 11,381,491 B2 | 7/2022 | Nadkarni et al. | |
| 2013/0065606 A1* | 3/2013 | Kurokawa | H04L 65/1045 |
| | | | 455/456.1 |
| 2015/0334027 A1* | 11/2015 | Bosch | H04L 47/12 |
| | | | 370/230 |
| 2016/0087859 A1* | 3/2016 | Kuan | H04L 41/122 |
| | | | 715/736 |
| 2016/0142931 A1 | 5/2016 | Mondal et al. | |
| 2016/0255013 A1 | 9/2016 | Cox et al. | |
| 2016/0344640 A1 | 11/2016 | Soderlund et al. | |
| 2017/0034023 A1 | 2/2017 | Nickolov et al. | |
| 2017/0054797 A1* | 2/2017 | Helmich | H04L 41/0896 |
| 2017/0208487 A1 | 7/2017 | Ratakonda et al. | |
| 2018/0241648 A1* | 8/2018 | Jenkins | H04L 69/16 |
| 2018/0309822 A1* | 10/2018 | Baradaran | H04L 41/142 |
| 2018/0316543 A1 | 11/2018 | Hwang | |
| 2018/0359186 A1* | 12/2018 | Harari | H04L 47/2483 |
| 2018/0367429 A1 | 12/2018 | Pani et al. | |
| 2019/0272331 A1* | 9/2019 | Gangadhar | H04L 41/0897 |
| 2019/0319863 A1* | 10/2019 | Gupta | H04W 24/04 |
| 2019/0342187 A1 | 11/2019 | Zavesky et al. | |
| 2019/0379544 A1 | 12/2019 | Suthar et al. | |
| 2020/0112487 A1* | 4/2020 | Inamdar | H04L 67/56 |
| 2020/0213187 A1 | 7/2020 | Padmanabhan et al. | |
| 2020/0235952 A1 | 7/2020 | Mukherjee et al. | |
| 2020/0296026 A1* | 9/2020 | Michael | H04L 43/08 |
| 2020/0296029 A1* | 9/2020 | Shenoy | H04L 41/12 |
| 2021/0044529 A1 | 2/2021 | Salem et al. | |

OTHER PUBLICATIONS

Christoffer Evjen Ottesen, Attacking Mobile Privacy By Catching MSISDN Location, 2017, URL retrieved via: https://ntnuopen.ntnu.no/ntnu-xmlui/bitstream/handle/11250/2459497/17622_FULLTEXT.pdf (Year: 2017).*

Non-Final Office Action on U.S. Appl. No. 17/837,730 dated Nov. 7, 2022.

Notice of Allowance on U.S. Appl. No. 17/837,730 dated Dec. 1, 2022.

Wikipedia, eNodeB (2018) URL retrieved via: https://web.archive.org/web/20181230024827/https://en.wikipedia.org/wiki/ENodeB, Dec. 30, 2018.

* cited by examiner

SYSTEM AND METHOD FOR MONITORING NETWORK PERFORMANCE

CROSS-REFERENCE TO RELATED PATENT APPLICATIONS

This application is a continuation to U.S. patent application Ser. No. 17/837,730, filed Jun. 10, 2022, which claims the benefit of priority as a continuation to U.S. patent application Ser. No. 16/849,463, filed Apr. 15, 2020 which claims the benefit of priority to U.S. patent application Ser. No. 62/833,942 filed Apr. 15, 2019, the entirety of each which is incorporated herein by reference in its entirety.

BACKGROUND

To optimize the performance and operation of modern computer networks, network operators routinely use network probes to monitor network traffic as well as measure end-user experience by calculating performance and quality parameters in real-time. These parameters include, but are not limited to, bit rate, jitter, packet drop rate or bit error rate, and packet latency. However, the enormous, and increasing, amounts of data transmitted over wired and wireless networks at high data transfer speeds, particularly with the introduction of the 10 gigabit ("10 GbE") networking standard, present a challenge to real-time monitoring of network performance.

Network performance monitoring is further complicated by telecommunications routers and gateways using new architectures, some of which are designed to support the 10 GbE networking standard for mobile networks. These architectures are also used, in part, to enable network service providers to prioritize certain types of network traffic.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, the illustrated embodiments relate to a system and method for monitoring one or more Mobility Management Entities (MMES) with a plurality of scalable Virtual Machines (VM)/probes arranged in a cluster format. A ciphered packet is received from a MME at a smart cluster device/probe whereby data is aggregated from the individual clustered VMs/probes for distribution to a monitoring device. The smart cluster device/probe is preferably configured to decipher the ciphered packet received from the MME and extract metadata from the deciphered packet to identify subscriber information for the received packet. The deciphered packet is then distributed to one of the plurality of clustered probes to balance the load amongst the plurality of clustered probes. The balancing of loads is based upon prescribed load balancing criteria such that each packet received for an identified subscriber is sent to a same probe such that load balancing is performed on a per subscriber basis and/or with other state-based criteria. KPI session related data associated with a subscriber is generated in a clustered probe that receives the distributed packet from the smart cluster device/probe. Subscriber related data from each clustered probe is then aggregated with at least one monitoring device operably coupled to the clustered probes such that a user of the monitoring device is provided with the perception that the monitoring device is coupled to a single probe.

Exemplary advantages provided by the illustrated embodiments include the monitoring of MMES is provided by using a cluster of probes each having relatively low capacity computing resources relative to a smart balancing probe that distributes packets received from MMES to a probe (e.g., a VM probe) arranged in clustered format. The load balancing performed by the smart balancing probe is performed in a stateful manner such that all packets associated with a subscriber session is distributed to a same probe in the probe cluster. The smart probe receiving packets from a MME provides load balancing functionality for a plurality of clustered arranged network probes. Each of the cluster of probes then provide for ASI data generation for a received distributed packet. Monitoring devices (such as an nGeniusOne (nG1) and a sessions analyzer (nSA) which are commercially available from NetScout Systems Inc.) aggregate data from the probe cluster for presentation to a user of a monitor device as if the data originated from a single probe.

BRIEF DESCRIPTION OF THE DRAWINGS

The accompanying appendices and/or drawings illustrate various non-limiting, example, inventive aspects in accordance with the present disclosure.

DETAILED DESCRIPTION

Figure 1:
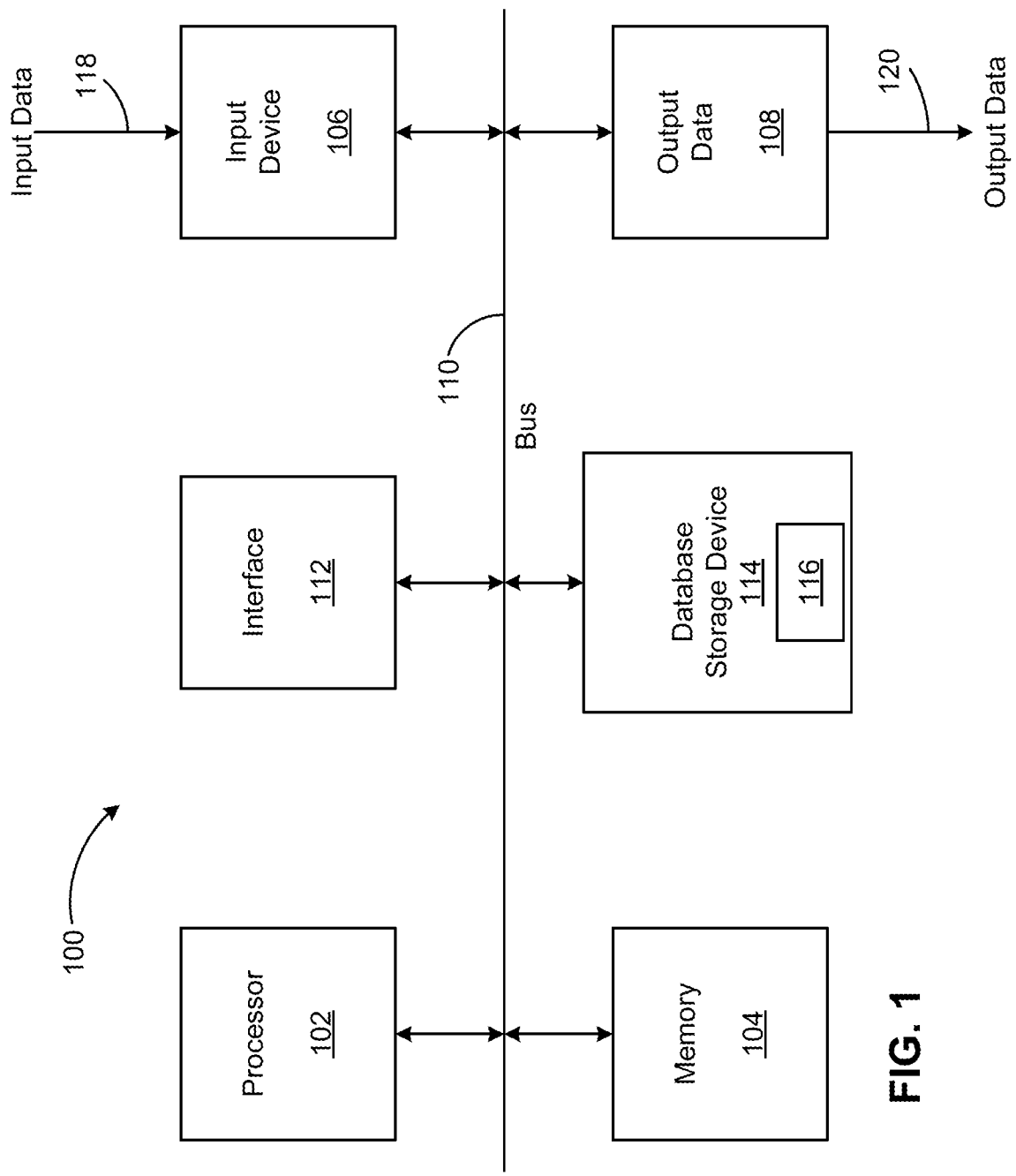
FIG. 1 depicts an exemplary computing system in which certain components of the below illustrated embodiment of FIG. 2 may be implemented.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary computing system in which below illustrated embodiments may be implemented.

A generalized computering embodiment in which the illustrated embodiments can be realized is depicted in FIG. 1 illustrating a processing system 100 which generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 may operate in a networked environment using logical connections to one or more remote computers. The remote computer may be a personal computer, a tablet device, smart phone device, a server, a router, a network PC, a peer device, or other common network node, and typically includes many or all of the elements described above.

It is to be further appreciated that the logical connections depicted in FIG. 1 include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

It is to be further appreciated, embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices. Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100 of FIG. 1 being generally shown and discussed above, reference is now made to FIG. 2 which illustrates an embodiment of a network transmission system 200 capable of transmitting packets from a Mixed Mobility Entity (MME) 202 to a cluster of network probes 210. The example network transmission system 200 is also configured to automatically balance the network monitoring load between several network probes 214, 216 at or near the data transmission rate ("line rate" or "approximate line rate"—1.5 M pps) of the network transmission system. In the illustrative embodiments, it is to be understood the MME 202, may consist of (but is not to be understood to be limited to) the following types of network interfaces: S1-MME, S3, S10 and S6a feed interfaces. The MME 202 may be either hardware and/or software based.

In certain illustrative embodiments, it is to be appreciated a ciphered packet received at a smart device/probe 212 (as described above) from the MME 202 may be a synthetic packet containing messages for a plurality of subscribers. The smart device/probe 212 is to be understood to be configured and operational to generate multiple synthetic packets from the received packet such that each generated packet is associated with an individual subscriber session. The smart device/probe 212 is then operational to distribute an aforesaid generated individual packet associated with an individual subscriber session to a probe 214, 216 in the cluster of probes 210 associated with that individual subscriber session. Additionally with regards to the smart device/probe 212, it is also preferably configured and operational to extract metadata from packets received from the MME 202, which metadata may include IMSI and IMEI-SV information (which may be utilized to generate the ASI data). The extracted metadata also preferably consists of session information to be utilized by the cluster of network probes 210 for performing parallel processing of packet sessions across multiple subscriber session threads—so as to optimize VM computer processing resources associated with the cluster of network probes 210. Also, the deciphering of packets in the smart device/probe 212 preferably determines Temporary Identifiers (M-TMSI) assigned to an individual subscriber. The smart cluster device 212 is further to be understood to be configured and operational to process handovers between eNodeBs such that deciphered packet information relating to an individual subscriber is distributed to a probe 214, 216 in the cluster of probes 210 which is associated with that individual subscriber.

The cluster of network probes 210 preferably includes a smart cluster device 212 configured to distribute packets received from the MME 202 to one of a plurality of network probes 212, 214 using load balancing techniques as described herein. One or more monitor devices 218, 220 are each preferably coupled to the network probes 214, 216 for performing various analytics functionalities relating subscriber packets received from the MME 202, as discussed further below. Transmission links preferably convey subscriber packets from the MME to the cluster of network probes 210 through any of a variety of networks, including the Internet (e.g., networks using TCP/IP protocol transmission), wireless communication networks (e.g., 3G, 4G LTE protocol networks), networks internal to an organization or entity (e.g., WLAN, LAN), and combinations thereof.

Figure 2:
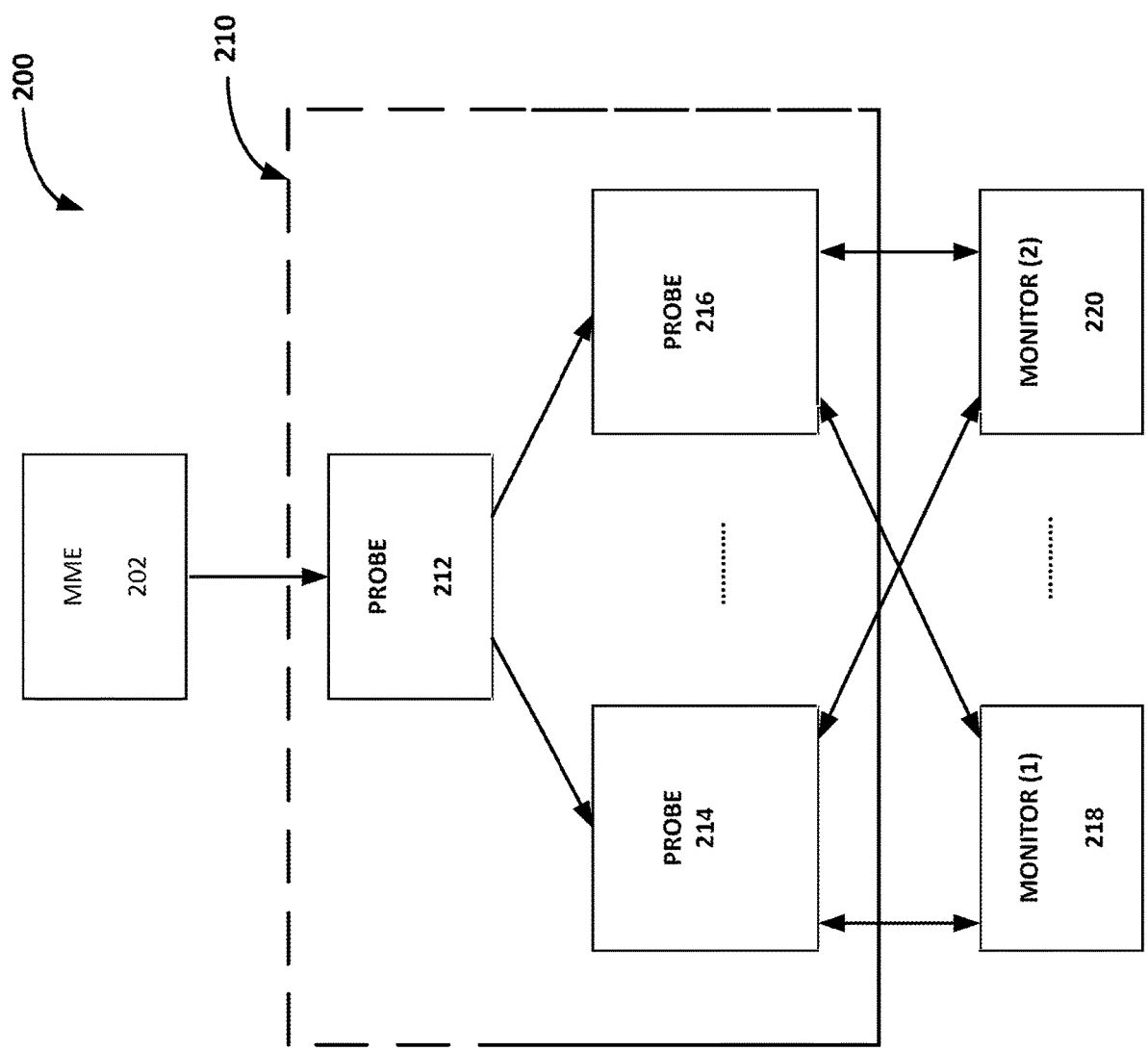
FIG. 2 depicts an illustrative embodiment of a network transmission system in accordance with the illustrated embodiments.

In accordance with the illustrative embodiment of FIG. 2, the probes (e.g., 212, 214, 216) in the cluster of network probes 210 are to be understood to be hardware, software, firmware, or combinations thereof, for monitoring data transmission through a plurality of transmission links. While generally the network probes 210 may be deployed at any of a variety of locations or links of a network to collect network data packets transmitted, in this case the network probes are connected to the network through the smart cluster probe 212 which, as described herein, performs balancing of subscriber packets between the multiple network probes 214, 216. It is to be understood, the network probes 210 may be a special purpose computing device or a software component (not limited to a single process) dedicated to monitoring data communicated via a network. Alternatively, the network probes 210 may be a computing device with specialized software components installed thereon. In one embodiment, the network probes 210 are a NGENIUS COLLECTOR, NGENIUS PROBE or NGENIUS INFINISTREAM ("ISNG device"), available from NetScout Systems, Inc. of Westford, MA For ease of illustration, only two probes 214, 216 are shown coupled to the smart cluster probe 212, however, it is to be understood any number of probes may be coupled to the smart cluster probe 212 in accordance with the teachings herein. It is to be appreciated each ISNG device provided in the cluster of probes 210 is configured and operational to generate Adaptive Service Intelligence (ASI) data relating to a subscriber packet session subject to analysis of an ISNG device. ASI data is to be understood to include key performance indicators and adaptive session records ("ASRs") as described in U.S. patent application Ser. No. 12/756,638 entitled "Real-Time Adaptive Processing of Network Data Packets for Analysis" and filed on Apr. 8, 2010. The methods and systems described in U.S. patent application Ser. No. 12/756,638 to enable the network probes 210 to analyze network performance and end user experience in real-time, without extensive network buffering and analysis. This application also incorporates by reference in its entirety U.S. Pat. No. 9,923,808.

Additionally, in the illustrative example of FIG. 2, each network probe 210 is depicted as a Virtual Machine (VM), however, and as stated above, each probe may consist of hardware, software, firmware, or combinations thereof, for monitoring data transmission through the plurality of transmission links 112. While generally the cluster of network probes 210 may be deployed at any of a variety of locations or links of a network to collect network data packets transmitted through certain links, in this case the network VMs 214, 216 are connected to the network through the smart cluster device/probe 212 which, as described herein, provides balancing of subscriber packets between the multiple network VMs 214, 216. In accordance with an illustrated embodiment, the smart device 212 may have prescribed data provided by a monitoring device 218, 220 for prescribing/conducting load balancing of packets received from the MME 202 amongst the cluster of probes 210.

It is to be understood the network transmission system 200 is shown in FIG. 2 to include a single cluster of network probes 210 coupled to a single MME 202 for ease of illustration purposes only as the it is to be understood the network transmission system may consists of multiple clusters of network probes 210 coupled to multiple MMES 202 in accordance with the teachings of the illustrative embodiments. Additionally, each cluster of network probes 210 may be coupled to any multiple of monitoring devices, and is not to be understood to be limited to the two monitor devices 218, 220 shown in FIG. 2.

Figure 3:
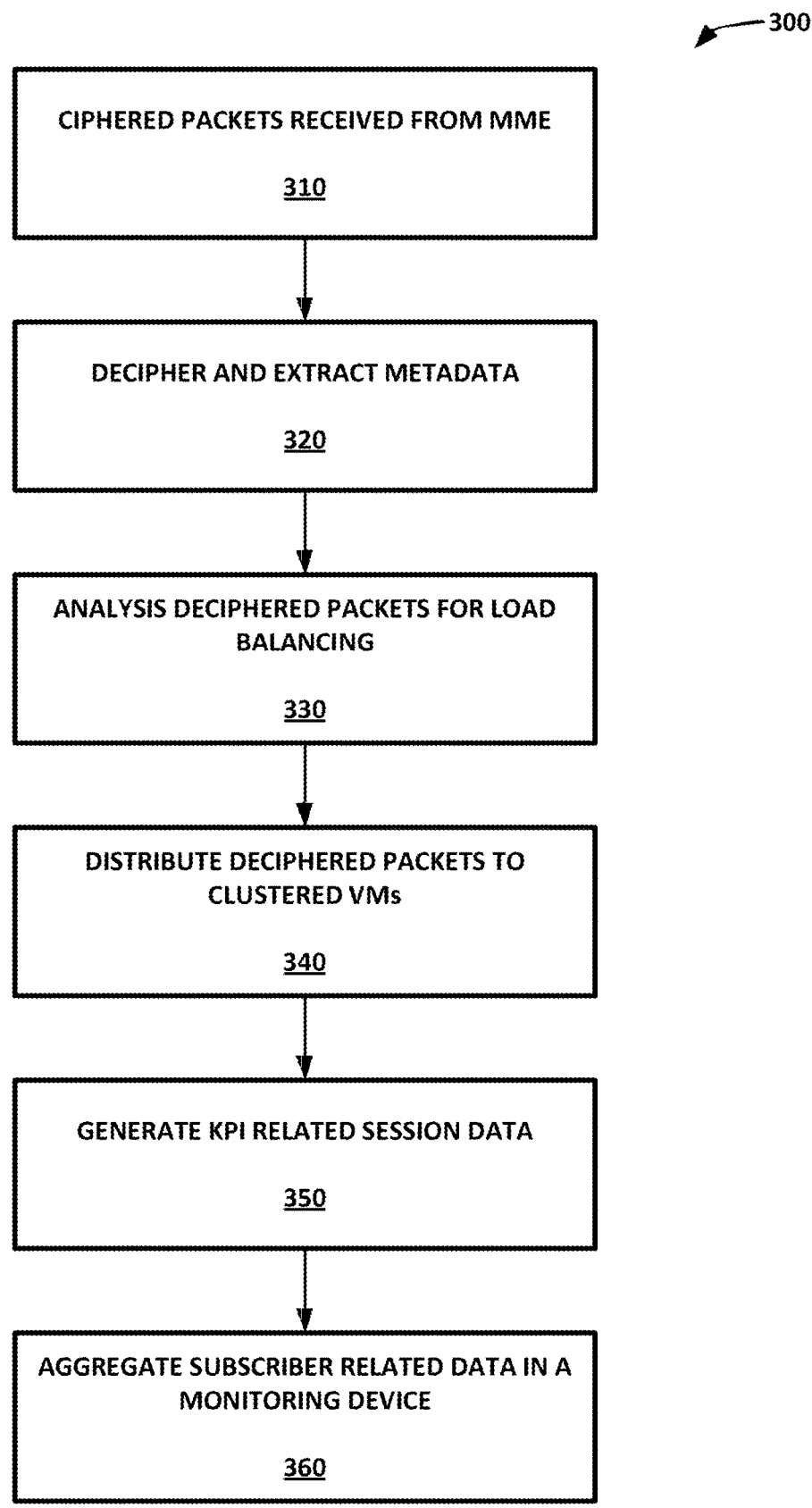
FIG. 3 is a flow chart depicting a process of operation of the system of FIG. 2 in accordance with the illustrated embodiments.

With certain components of system 200 described above, a description of operation of the network transmission system 200 of FIG. 2 is now provided with reference to process 300 of FIG. 3. It is to be understood network system 200 provides a system and method for monitoring one or more Mobility Management Entities (MMES) 202 with a plurality of scalable Virtual Machines (VM) ("probes") 210 arranged in a cluster format so as to aggregate data from the clustered VMs 214, 216 for distribution to one or more monitoring devices 218, 220. In operation, ciphered packets are received from a MME 202 at the VM smart cluster device 212 (step 310). The smart cluster device is configured and operational to decipher the ciphered packet received from the MME 202 and extract metadata from the deciphered packet to identify subscriber information contained in the received packet (step 320).

The deciphered packets are then preferably analyzed by the VM smart cluster device 212 (e.g., via deep packet inspection) for subsequent load balancing distribution (step 330). The VM smart cluster device 212 next preferably distributes the deciphered packet to one of the plurality of clustered VMs 214, 216 to balance the load amongst the plurality of clustered VMs 214, 216 (step 340). It is to be understood the load balancing performed by smart cluster device 212 is preferably based upon prescribed load balancing criteria such that each packet received from the MME 202 for an identified subscriber is sent to a same VM (e.g., VM 214) such that load balancing is performed on a per subscriber basis and/or with other state-based criteria. The load balancing performed amongst the cluster of network probes 210 by the smart cluster probe 212 is preferably performed in accordance with a stateful process, and preferably dependent upon deep packet inspection of a packet received from the MME 220 by the smart cluster probe 212. It is to be further understood the load balancing performed by the network transmission system 210 is scalable such that individual probes 214, 216 may be added or subtracted (e.g., activated, inactivated) from the cluster of probes 210 preferably predicated upon network demand of the MME 202 to provide scalability and efficient cluster based monitoring provided by the network transmission system.

Upon receipt of a packet from the smart cluster probe 212, a receiving probe 214 preferably generates KPI session related data associated with a subscriber associated with the received packet (step 350). The subscriber related data is then preferably aggregated from each VM with at least one monitoring device 218, operably coupled to the clustered VMs (e.g., 214, 261) wherein a user of the monitoring device 218, 220 is provided with the perception that the monitoring device 218, 220 is coupled to a single VM (e.g., VM 214) (step 360). The subscriber related data generated by each probe 214, 216 in the cluster of probes 210 upon processing of the received deciphered packet information is preferably stored in a memory device (e.g., a disk, database, etc.) associated with the probe 214, 216. Additionally, it is to be understood KPI information relating to a subscriber generated by each probe 214, 216 in the cluster of probes 210 is preferably distributed for storage in a monitoring device 218, 220.

It is to be appreciated that each monitor device 218, 220 is configured to perform on-demand and/or real-time analysis of subscriber packet information received in the cluster of network probes 210. For instance, when performing on-demand analysis, subscriber data is aggregated preferably from each probe 214, 216 of the cluster of network probes 210. The monitor device 218, 220 is preferably configured to aggregate Key Performance Indicator (KPI) data from the clustered probes 210 associated with subscribers (step 360). In such an exemplary embodiment, the monitor device may consist of an nGeniusOne device sold by NetScout Systems, Inc. of Westford, Ma.

When performing real-time analysis, a monitor device 218, 220 is configured and operational to perform real-time analysis of subscriber packet information by querying and retrieving subscriber information from the cluster of probes 210 relating to a user analysis request in a certain monitor device 218, 220 so as to retrieve subscriber session data from an individual VM probe (e.g., 216) regarding a subscriber session associated with that user analysis. In such an exemplary embodiment, a monitor device 218, 220 may consist of a packet session analyzer ("nsa") (e.g., Iris Session Analyzer sold by NetScout Systems, Inc. of Westford, Ma.) configured to analyze subscriber calls and sessions, being preferably configured to perform deep packet analysis on the retrieved subscriber data.

It is to be further understood and appreciated that when the aforesaid network transmission system 200 is monitoring one or more Mobility Management Entities (MMES) 202 with a cluster of network probes 210 as described above, subscriber sessions across X2 and S1 handovers are also monitored and tracked by the system 200. Additionally, the system 200 is further configured and operational to detect session transitions during MME handovers and during inter-RAT handovers. Additionally, it is to be appreciated that one or more of: deciphering of packets in the smart device/probe 212 to determine M-TMSI assigned to an individual subscriber; keeping track of subscriber sessions across idle and active transitions; keeping track of subscriber session across X2 and S1 handovers; detecting session transitions during MME handovers; and detecting session transitions during inter-RAT handovers by the illustrative network transmission system 200 may preferably be performed when monitoring a Unified Serving Node (USN).

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for monitoring network performance in a telecommunication network coupled with a plurality of Virtual Machines (VM) arranged in a cluster format, comprising:
   receiving a packet from the telecommunication network at a VM smart cluster device;
   extracting metadata from the packet to identify subscriber information for the received packet, wherein the metadata includes an international mobile subscriber identity (IMSI) and an international mobile station equipment identity software version (IMEI-SV) information utilized to generate Adaptive Service Intelligence (ASI) data;
   distributing the packet to one of the plurality of VMs to balance the load amongst the plurality of VMs based upon prescribed load balancing criteria such that each packet received for an identified subscriber is sent to a same VM for performing load balancing on a per subscriber basis; and
   generating key performance indicator (KPI) session related data associated with a subscriber in one of the plurality of VMs that receives the distributed packet from the VM smart cluster device.

2. The method of claim 1, wherein receiving the packet from the telecommunication network comprises receiving a ciphered packet from the telecommunication network.

3. The method of claim 2, comprising:
   deciphering the ciphered packet in the VM smart cluster device.

4. The method of claim 1, comprising:
   aggregating subscriber related data from each VM in at least one monitoring device operably coupled to the plurality of VMs.

5. The method of claim 4, wherein the at least one monitoring device is configured to perform on-demand analysis of subscriber packet information that includes aggregated subscriber information received from the plurality of VMs such that subscriber data is aggregated from each of the plurality of VMs.

6. The method of claim 4, wherein the prescribed criteria for load balancing is prescribed by the at least one monitoring device.

7. The method of claim 4, comprising:
   aggregating data from the VMs for distribution to the at least one monitoring device.

8. The method of claim 1, wherein the VM smart cluster device is configured to extract the metadata using state machine processing.

9. The method of claim 1, wherein a plurality of monitoring devices are operably coupled to the plurality of VMs and wherein each monitoring device is configured to perform deep packet inspection regarding subscriber packets received from one of the plurality of VMs.

10. The method of claim 1, wherein the VM smart cluster device performs load balancing amongst the VMs in a stateful manner whereby load balancing criteria is based upon deep packet inspection by the VM smart cluster device.

11. The method of claim 1, further comprising adding and subtracting a VM from the plurality VMs to provide scalability amongst the plurality of VMs, wherein scalability is dependent upon network load demand of a mobility management entity (MME) for providing efficient cluster based monitoring.

12. The method of claim 1, wherein each VM is a network probe device.

13. A computer system for monitoring a telecommunication network, comprising:
   a VM smart cluster device coupled to the telecommunication network for receiving a packet and being configured to extract metadata from the packet to identify subscriber information for the received packet, wherein the metadata includes an international mobile subscriber identity (IMSI) and an international mobile station equipment identity software version (IMEI-SV) information utilized to generate Adaptive Service Intelligence (ASI) data;
   a plurality of VMs operatively coupled to the VM smart cluster device for distributing the packet to one of the plurality of VMs to balance the load amongst the plurality of VMs based upon prescribed load balancing criteria such that each packet received for an identified subscriber is sent to a same VM for performing load balancing on a per subscriber basis, wherein each of the plurality of VMs is configured to generate key performance indicator (KPI) session related data associated with a subscriber.

14. The system of claim 13, comprising:
   at least one monitoring device operably coupled to the plurality of VMs configured to aggregate subscriber related data from each coupled VM.

15. The system of claim 14, wherein the at least one monitoring device is configured to perform on-demand analysis of subscriber packet information that includes aggregated subscriber information received from the plurality of VMs such that subscriber data is aggregated from each of the plurality of VMs.

16. The system of claim 15, wherein the prescribed criteria for load balancing is prescribed by the at least one monitoring device.

17. The system as recited in claim 14, wherein the at least one monitoring device is configured to aggregate KPI data from the plurality of VMs associated with subscribers.

18. The system as recited in claim 13, wherein the VM smart cluster device performs load balancing amongst the VMs in a stateful manner whereby load balancing criteria is based upon deep packet inspection by the VM smart cluster device.

* * * * *